Figure 1:
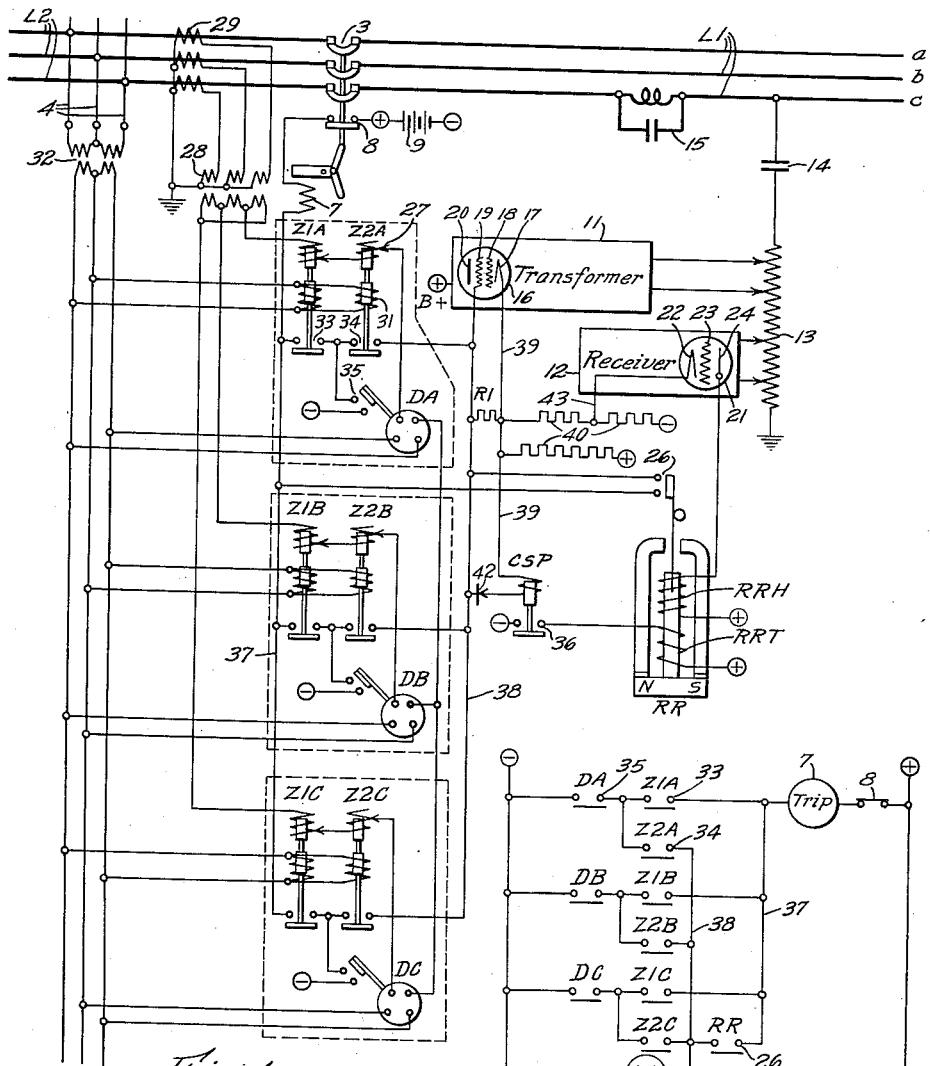

Aug. 6, 1940.    B. E. LENEHAN    2,210,679
SIMPLIFIED CARRIER-CURRENT RELAYING SYSTEM
Filed May 27, 1939

WITNESSES:
C. J. Weller.
Wm. C. Groome.

INVENTOR
Bernard E. Lenehan.
BY O. B. Buchanan
ATTORNEY

Patented Aug. 6, 1940

2,210,679

UNITED STATES PATENT OFFICE 2,210,679

SIMPLIFIED CARRIER-CURRENT RELAYING SYSTEM

Bernard E. Lenehan, Bloomfield, N. J., assignor to Westinghouse Electric & Manufacturing Company, East Pittsburgh, Pa., a corporation of Pennsylvania Application May 27, 1939, Serial No. 276,089

14 Claims. (Cl. 175—294)

My invention relates to carrier-current or pilot-channel protective systems for protecting transmission-lines against faults, and it has particular relation to a simple modification of the well-known and very successful intermittent-carrier system with normally biased receiver-relays.

It is the principal object of my invention to provide such a system wherein fewer relays are required, and wherein a somewhat different operation is obtained in the way of obtaining more of the so-called "transferred tripping" type of response, rather than the so-called "directional comparison" type which has heretofore been obtained with intermittent-carrier relaying systems having normally biased receiver-relays. The well-known intermittent-carrier system with normally biased receiver-relays is a system in which the carrier-current transmitters at the two ends of a protected line-section are normally in a non-transmitting state, and the receiver-relays at the respective ends of the protected line-section are also normally biased so as to have open contacts in the tripping circuit. The carrier current is utilized for the purpose of preventing any tripping response of the receiver-relays at both ends of the protected line-section. In the form of intermittent-carrier protective systems heretofore known, the carrier current has been removed from both ends of the protected line-section in response to an internal direction of the line-current at each of the aforesaid ends of the protected line-section.

My invention is based upon the well-known fact that, if there is a fault on the protected line-section at a point close to the relaying end, or within about 80% or 90% of the length of the line-section from the relaying end, it will be easy to provide what are commonly known as first-zone protective relays for reliably responding to such faults and effecting a tripping operation without any help or supervision from the far end of the protected line-section; whereas, if the fault occurs close to the far end of the protected line-section, the relays at the first-mentioned end, or relaying end, require the assistance of an indication from the far end to determine whether the fault is on the one side or of the other side of the far end of the protected line-section. At said far end, however, under these circumstances, that is, where the fault is somewhere close to said far end, it is easy to provide reliable relaying means for determining on which side of the far end the fault is located, such means usually taking the form of a directional element supervised by a fault-responsive element.

It is an object of my present invention to provide very simple control-circuits for making use of these well-known principles in a novel and distinctive manner, resulting in equipment which is less expensive, much more simple, and therefore more reliable in operation and easier to maintain, than previous systems which have become more or less accepted and standardized in the art.

Figure 2:
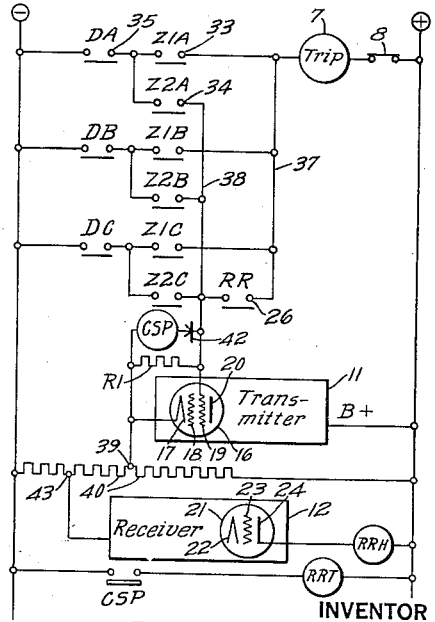

With the foregoing and other objects in view, my invention consists in the apparatus, combinations, circuits, systems and methods hereinafter described and claimed, and illustrated in the accompanying drawing, wherein:

Figure 1 is a simplified diagrammatic view of circuits and apparatus illustrating my invention in a preferred form of embodiment, and Fig. 2 is an "across the line" diagram of the direct-current connections of the system shown in Fig. 1.

In Fig. 1, I illustrate the relaying equipment for one end of a protected line-section L1 of a three-phase transmission-line, such illustration being representative of the equipment at all of the other line-section terminals. The protected line-section L1, comprising the three phase-conductors $a$, $b$ and $c$, is joined by means of an oil circuit-breaker 3, to a station-bus 4 which is illustrated as having another line-section L2 connected thereto. The line circuit-breaker 3 is provided with a trip-coil 7, and with an auxiliary contact 8 which is closed whenever the circuit breaker is closed, and opened whenever the circuit breaker opens its main contacts. The trip-coil 7 is adapted to be energized, in series with the auxiliary switch 8, from a tripping battery 9, the terminals of which are indicated as (+) and (—).

The relaying system shown in Fig. 1 is a carrier-current system utilizing a carrier-current transmitter 11 and a carrier-current receiver 12 which are coupled to an inductance device 13 which is connected, through a coupling capacitor 14, between the phase-C line-conductor and ground, the carrier currents being more or less confined to said phase-C conductor by means of a wave-trap 15.

The carrier-current transmitter 11 is diagrammatically illustrated as comprising an oscillator-tube 16 which has a cathode 17, a control-grid 18, a screen-grid 19, and an anode 20, and it is energized by means of the tripping-battery 9, serving as a B-battery, as indicated by the terminals (+) and (—). The carrier-current receiver 12 is diagrammatically represented as comprising a tube 21 having a cathode 22, a grid 23 and an anode 24, the receiver being also energized from the tripping-battery 9 which is represented by the terminals (+) and (—).

The relaying equipment comprises a carrier-current receiver-relay RR having a normally open relay-contact 26, a holding-coil RRH for strongly holding the receiver-relay in its normal open-contact position, and a so-called tripping or actuating coil RRT for causing the receiver-relay to respond so as to move to its closed-contact position in the absence of the restraint which is imposed by the holding-coil RRH when the latter is energized. The receiver-relay is also provided with a polarizing means in the form of a permanent magnet as indicated by the letters N and S.

In Fig. 1, I illustrate my invention as being applied to a phase-fault protective device in which three sets of phase-fault detector-relays are utilized, one for each of the line-phases, but I wish it to be understood that such illustration is more or less general in its application, being applicable to any line-fault relays, by which term I mean to include polyphase-responsive relays, separate single-phase phase-fault relays, ground-fault relays, or any other relays for responding to any kind of fault on the line.

In Fig. 1, I also show my invention as being embodied in a system utilizing impedance or distance-responsive relays for detecting the presence of a fault, but here again I wish such illustration to be regarded as more or less general, as indicative of any preferred or desired form of fault-detector relays, particularly in a system in which there are at least two such fault detector-relays of different sensitivities, as will now be explained.

In Fig. 1, I illustrate my invention as embodying three single-phase impedance-relay panels, one for each of the line-phases a, b and c, the different phases being distinguished by suffixes A, B and C. Each panel consists of a first-zone impedance-element Z1, a second-zone impedance-element Z2, and a directional element D. Each impedance-element comprises an operating winding 27 which is energized from a set of auxiliary current-transformers 28 which, in turn, derive their energy from a set of line-current transformers 29, and a restraining winding 31 which is energized from the line-voltage through a set of potential-transformers 32. The directional elements D are energized so as to compare the direction of the line-current with respect to the line-voltage, in the different phases, in a manner which is well understood, and which is illustrated in the drawing. Each of the first-zone impedance-elements, such as Z1A, is provided with a make-contact 33; each of the second-zone impedance-elements, such as Z2A, is provided with a make-contact 34; and each of the directional elements, such as DA, is provided with a make-contact 35.

In addition to the foregoing relaying elements, I also provide an auxiliary relay or contactor-switch, marked CSP, having a make-contact 36.

The novel features of my invention relate to the direct-current connections which are shown in both Figs. 1 and 2. As has been known heretofore, the tripping connections, for producing a line-sectionalizing operation of the circuit-breaker 3, utilize circuits including the serially connected relay-contacts of any one of the following groups, for energizing the trip-coil 7 of the circuit breaker, said groups including DA—Z1A, DB—Z1B, DC—Z1C, DA—Z2A—RR, DB—Z2B—RR, and DC—Z2C—RR. For convenience of reference, I shall apply the numeral 37 to the tripping bus which is energized through any one of the six tripping connections just mentioned, and I shall apply the numeral 38 to the auxiliary bus which is energized by any one of the three relay-contact circuits DA—Z2A, DB—Z2B or DC—Z2C.

The novel feature of my invention relates to the manner of controlling the carrier-current transmitter 11 and the auxiliary relay CSP. The oscillator-cathode 17 of the transmitter 11 is connected to an intermediate point 39 of a potentiometer-resistor 40 which is connected between the positive terminal (+) and the negative terminal (—) of the tripping battery 9. The oscillator-plate or anode 20 is, of course, connected to the positive battery-terminal (+) through the internal connections of the transmitter 11, as indicated by the B+ connection entering the transmitter at a point adjacent to said anode. In accordance with my invention, I connect the trip-coil 7, and its associated auxiliary circuit-breaker contact 8, between the tripping bus 37 and the aforesaid positive terminal (+), while the negative terminal (—) of the tripping battery 9 is applied to the energizing circuits, for the tripping bus 37, which start with the relay-contacts of one of the three directional elements DA, DB and DC. In accordance with my invention, I also connect the intermediate or auxiliary relaying bus 38 to the screen-grid 19 of the oscillator-tube 16, and I connect this same auxiliary bus 38 to the conductor 39 and the oscillator-cathode 17, through the operating coil of the auxiliary relay CSP and a serially-connected rectifier-valve 42, the latter being arranged to asymmetrically conduct current in the direction from the auxiliary bus 38 to the intermediate potentiometer-point 39.

The remaining direct-current connections are conventional, and comprise an energizing circuit for the receiver-relay tripping-coil RRT through the CSP relay-contact 36, and an energizing connection for the receiver-relay holding-coil RRH through the plate-circuit of the receiver-tube 21, said circuit being traceable from the positive battery-terminal (+), through the coil RRH to the anode 24 and cathode 22 of the receiver-tube 21, and thence to a tapped point 43 on the negative side of the potentiometer-resistor 40, these connections being merely illustrative.

In operation, during normal fault-free conditions, when there is no fault on the transmission system, the transmitter-oscillator 16 is held in a non-oscillating condition by means of a substantially zero bias which is applied to the screen-grid 19, with respect to the cathode 17, by means of the CSP operating-coil and the rectifier 42, the latter having sufficient reverse-current conductivity to control the potential of the screen-grid 19 under these normal fault-free conditions, or a by-passing resistor R1 may be provided for this purpose, as shown.

If a fault occurs in the protected line-section within the reach of the first-zone impedance-element Z1A, Z1B or Z1C, the tripping bus 37 will be directly energized without reference to the condition of the carrier-current receiver-relay RR, thus producing a line-sectionalizing operation at this point.

If a fault, accompanied by a line-current flowing into the protected line-section, occurs beyond the reach of the first-zone impedance-elements Z1A, Z1B or Z1C, but within the reach of the more sensitive second-zone impedance-elements Z2A, Z2B or Z2C, at any relaying point, it will be impossible to obtain a tripping operation at that relaying point, with the equipment which is illustrated, unless the receiver-relay RR responds so as to close its tripping-contact 26.

It is an important feature of my invention that the relative distance-seatings of the first-zone and second-zone impedance-elements, such as Z1A and Z2A, respectively, are so adjusted that the more sensitive second-zone fault-responsive element Z2A, has a reach to respond to faults, accompanying by current-flow into the protected line-section, further away than the length of the protected line-section, but not as far away as said length plus the reach of the first-zone fault-responsive element Z1A when the latter is responding to current-flow out of the protected line-section. The reason for this requirement is as follows. The second-zone impedance-element must reach further than the far end of the protected line-section in order that it shall respond to any possible fault within the protected line-section. The reason for the limitation to the extent of the reach of the second-zone impedance-element, such as Z2A, is to make certain that, when the fault is beyond the far end of the protected line-section, the first-zone impedance-element at said far end of the protected line-section shall be better able to respond to the fault, that is, it will reach further out, than the second-zone impedance-element at the near end or the relaying point first considered.

The result of the foregoing operation, as to the relative settings of the first and second-zone impedance-elements relative to the length of the protected line-section, in conjunction with the special grid-controlling connections hereinabove described, is that, at any time when the auxiliary relaying circuit 38 is energized, at either end of the protected line-section, as a result of a response of the directional element DA, DB or DC to inwardly flowing current, flowing into the protected line-section, accompanied by a response of the corresponding second-zone impedance-element Z2A, Z2B or Z2C, the conditions at the far end of the protected line-section will be such that the first-zone impedance-element at that end will necessarily always operate. And since the first-zone impedance-element is less sensitive than the second-zone impedance-element, it follows that both the first-zone and second-zone impedance-elements at the far end will necessarily operate.

Reference to the drawing will show that simultaneous responses of the first and second-zone impedance-elements, such as Z1A and Z2A, will close the relay-contacts 33 and 34, and will connect the screen-grid 19 of the oscillator-tube 16 to the positive battery-terminal (+) and hence to the oscillator-plate 20, through a circuit 38—34—33—37—(trip-coil 7)—(auxiliary switch 8). The circuit just traced includes a certain amount of resistance which is the resistance of the trip-coil 7, but this resistance, in accordance with my invention, is small compared to the serially-connected resistance R1, so that the circuit 38—34—33—7—8 has a voltage-drop which is a very small proportion of the total voltage from the positive battery-terminal (+) to the cathode-connected intermediate point 39, most of said total voltage being absorbed in the resistor R1.

In the manner just described, the transmitter 11 at the far end of the protected line-section, under the described circumstances, will commence to oscillate by reason of the application of a positive bias to the screen-grid 19 with respect to the cathode 17. An advantage of controlling the oscillation of the oscillator-tube 16 by means of the screen-grid 19, instead of the plate or anode 20, follows from the fact that the screen-current is usually about one-fifth of the plate-current, and thus gives less drop through the trip-coil 7, which, of course, must be designed so that it will not trip the circuit-breaker 3 until the directionally responsive contact, such as 35, closes.

The result of the above-described initiation of carrier-current transmission at the far end of the protected line-section is that the receiver-relay holding-coils RRH at both ends will be energized, so that the receiver-relay contact 26 will not close at the first-mentioned end unless carrier is ultimately removed from the far end. In this way, I avoid the possibility of faulty tripping at the first-mentioned end, where it was assumed that the line-current direction was that which is known as "internal," so as to cause a response of the directional element, such as DA, and where it was further assumed that the fault was too far away to effectively energize Z1A, but sufficiently close to cause a response of Z2A.

If now, this fault, which is assumed to be close to the far end of the protected line-section, is beyond the far end of the protected line-section, the current-direction at said far end will be "external," or out of the protected line-section, so that the directional element, such as DA, at said far end, will not respond at all. Hence carrier-current will remain on the line indefinitely, or until the fault is cleared by some other means than the illustrated relaying system, usually by the corresponding equipment in the line-section in which the fault is located.

If, however, the assumed fault were within the protected line-section, but so close to the far end thereof that it is beyond the reach of the first-zone relaying element, such as Z1A, at the first-mentioned relaying point, the current-direction at the far end will be "internal," so that the directional element, such as DA, at said far end, will be actuated. As soon as both the directional element, such as DA, and the corresponding second-zone impedance-element, such as Z2A, are actuated, applying the full negative battery-voltage to the auxiliary tripping bus 38, the potential of the screen-grid 19 will be made so negative that carrier-current transmission is immediately made impossible, regardless of anything else which can be done to it. This event may occur either before or after the carrier-current transmission is initiated at this far-end station, depending upon whether the relay-circuits 35—34 become closed before, or after, the relay-circuits 33—34, although, in general, the fault-responsive contacts 33 and 34 will close before the directionally responsive contacts 35.

Assuming, now, that the fault is within the protected line-section, then both the directional element, such as DA, and the second-zone impedance-element, such as Z2A, will respond, at both ends of the protected line-section, so that there can be no carrier-current on the protected line-section. The receiver-relay holding-coils RRH will be deenergized at both ends of the protected line-section, and the receiver-relays RR will respond, closing their tripping-contacts, and resulting in a tripping operation, as soon as the receiver-relay tripping-coils RRT are energized.

These receiver-relay tripping-coils RRT, at the respective ends of the protected line-section, are energized by a response of the auxiliary relay CSP at said respective ends. According to my present invention, the operating coil of the auxiliary relay CSP is energized whenever the auxiliary bus 38 is connected to the negative battery-terminal (—), as through the DA-contact 35 and the Z2A-contact 34. The complete energizing-circuit of the CSP-coil may be then traced from the positive battery-terminal (+), through a portion of the potentiometer-resistance 40, to the intermediate point 39, and thence through the CSP-coil and the rectifier 42 to the auxiliary bus 38, which is connected to the negative battery-terminal (—) through the contacts 34 and 35. The presence of the rectifier 42 in series with the CSP-coil insures that the latter shall not receive an effective actuating-current when the auxiliary bus 38 is positive with respect to the intermediate potentiometer-point 39, as when the impedance-responsive contacts 34 and 33 are closed, while the directionally responsive contact 35 is open.

It will be perceived, from the foregoing, that my present relaying-system departs from the usual intermittent-carrier relaying system with normally biased receiver-relays, wherein the usual plan is to initiate carrier-current transmission in response to a very sensitive fault-detector. On the contrary, in my present system, I initiate carrier-current transmission only in response to the least sensitive, or first-zone, fault-detector element, with corresponding changes in the controlling connections, which I have described, so that the result is that I do not utilize carrier at all, except for the one case in which the fault is very close to the far end of the protected line-section, and within the reach of the first-zone impedance-element at said far end.

While I have illustrated my invention, and described its essential principles of design and operation, in connection with but a single embodiment which at present seems to be desirable, I wish it to be understood that the invention is susceptible of many modifications and further applications, which will be obvious to those skilled in the art. I desire, therefore, that the appended claims shall be accorded the broadest interpretation consistent with their language and the prior art.

I claim as my invention:

1. Protective relaying equipment for a transmission-line, including a signal-current pilot-channel between the ends of a line-section to be protected, and further including, at each of said ends, a normally non-transmitting signal-current transmitter and a signal-current receiver-relay associated with said pilot-channel, a line-sectionalizing circuit-interrupter means, a first and a second fault-responsive relaying-means which are responsive to line-faults, the second fault-responsive relaying-means being the more sensitive, a directional relaying-means responsive to line-fault conditions, means responsive to a receipt of signal-current for restraining said receiver-relay against responding, means jointly responsive to a response of said second fault-responsive relaying-means and to a predetermined condition of said directional relaying-means for causing a response of said receiver-relay in the absence of said restraint and for preventing said transmitter from transmitting signal-current into said pilot-channel, means responsive to a joint response of said first fault-responsive relaying means and said second fault-responsive relaying-means for causing said transmitter to transmit signal-current into said pilot-channel in the absence of said prevention, means jointly responsive to a response of said first fault-responsive relaying-means and to a predetermined condition of said directional relaying-means for effecting a line-sectionalizing operation of said circuit-interrupter means, and means triply responsive to a response of said second fault-responsive relaying-means, a predetermined condition of said directional relaying-means, and a response of said receiver-relay, for effecting a line-sectionalizing operation of said circuit-interrupter means.

2. Protective relaying equipment for a transmission-line, including a signal-current pilot-channel between the ends of a line-section to be protected, and further including, at each of said ends, a normally non-transmitting signal-current transmitter and a signal-current receiver-relay associated with said pilot-channel, a line-sectionalizing circuit-interrupter means, a first and a second fault-responsive relaying-means which are responsive to line-faults on both sides of the relaying point, the second fault-responsive relaying-means being the more sensitive and having a reach to respond to faults, accompanied by current-flow into the protected line-section, further away than the length of the protected line-section but not as far away as said length plus the reach of the first fault-responsive relaying-means when the latter is responding to current-flow out of the protected line-section, a directional relaying-means sensitively responsive to line-fault conditions accompanied by current-flow into the protected line-section, means responsive to a receipt of signal-current for restraining said receiver-relay against responding, means responsive to a joint response of said second fault-responsive relaying-means and said directional relaying-means for causing a response of said receiver-relay in the absence of said restraint and for preventing said transmitter from transmitting signal-current into said pilot-channel, means responsive to a joint response of said first fault-responsive relaying-means and said second fault-responsive relaying-means for causing said transmitter to transmit signal-current into said pilot-channel in the absence of said prevention, means responsive to a joint response of said first fault-responsive relaying-means and said directional relaying-means for effecting a line-sectionalizing operation of said circuit-interrupter means, and means responsive to a triple response of said second fault-responsive relaying-means, said directional relaying-means, and said receiver-relay, for effecting a line-sectionalizing operation of said circuit-interrupter means.

3. Protective relaying equipment for a transmission-line, including a signal-current pilot-channel between the ends of a line-section to be protected, and further including, at each of said ends, a normally non-transmitting signal-current transmitter and a signal-current receiver-relay associated with said pilot-channel, a line-sectionalizing circuit-interrupter means, a first and a second fault-responsive relaying-means which are responsive to line-faults, the second fault-responsive relaying-means being the more sensitive, a directional relaying-means responsive to line-fault conditions, means responsive to a receipt of signal-current for restraining said receiver-relay against responding, means responsive jointly to a response of said second fault-responsive relaying-means and to a predetermined condition of said directional relaying-means for causing a response of said receiver-relay in the absence of said restraint and for preventing said transmitter from transmitting signal-current into said pilot-channel, means for utilizing a response of said first fault-responsive relaying-means for causing said transmitter to transmit signal-current into said pilot-channel in the absence of said prevention, means jointly responsive to a response of said first fault-responsive relaying-means and to a predetermined condition of said directional relaying-means for effecting a line-sectionalizing operation of said circuit-interrupter means, and means triply responsive to a response of said second fault-responsive relaying-means, a predetermined condition of said directional relaying-means, and a response of said receiver-relay, for effecting a line-sectionalizing operation of said circuit-interrupter means; characterized by said transmitter comprising an oscillator-tube comprising a plurality of electrodes, the two means for effecting a line-sectionalizing operation of the circuit-interrupter means comprising a trip-coil, and the means for causing the transmitter to transmit comprising a circuit, including said trip-coil and a closed-circuit means of said first fault-responsive relaying-means, for so altering the relative potential of one of said electrodes relative to another, as to cause said tube to oscillate.

4. Protective relaying equipment for a transmission-line, including a signal-current pilot-channel between the ends of a line-section to be protected, and further including, at each of said ends, a normally non-transmitting signal-current transmitter and a signal-current receiver-relay associated with said pilot-channel, a line-sectionalizing circuit-interrupter means, a first and a second fault-responsive relaying-means which are responsive to line-faults on both sides of the relaying point, the second fault-responsive relaying-means being the more sensitive and having a reach to respond to faults, accompanied by current-flow into the protected line-section, further away than the length of the protected line-section but not as far away as said length plus the reach of the first-fault-responsive relaying-means when the latter is responding to current-flow out of the protected line-section, a directional relaying-means sensitively responsive to line-fault conditions accompanied by current-flow into the protected line-section, means responsive to a receipt of signal-current for restraining said receiver-relay against responding, means responsive to a joint response of said second fault-responsive relaying-means and said directional relaying-means for causing a response of said receiver-relay in the absence of said restraint and for preventing said transmitter from transmitting signal-current into said pilot-channel, means for utilizing a response of said first fault-responsive relaying-means for causing said transmitter to transmit signal-current into said pilot-channel in the absence of said prevention, means responsive to a joint response of said first fault-responsive relaying-means and said directional relaying-means for effecting a line-sectionalizing operation of said circuit-interrupter means, and means responsive to a triple response of said second fault-responsive relaying-means, said directional relaying-means, and said receiver-relay, for effecting a line-sectionalizing operation of said circuit-interrupter means; characterized by said transmitter comprising an oscillator-tube comprising a plurality of electrodes, the two means for effecting a line-sectionalizing operation of the circuit-interrupter means comprising a trip-coil, and the means for causing the transmitter to transmit comprising a circuit, including said trip-coil and a closed-circuit means of said first fault-responsive relaying-means, for so altering the relative potential of one of said electrodes relative to another, as to cause said tube to oscillate.

5. The invention as defined in claim 1, characterized by said transmitter comprising an oscillator-tube comprising a plurality of electrodes, the two means for effecting a line-sectionalizing operation of the circuit-interrupter means comprising a trip-coil, and the means for causing the transmitter to transmit comprising a circuit, including said trip-coil and a closed-circuit means of each of said first and second fault-responsive relaying-means, for so altering the relative potential of one of said electrodes relative to another, as to cause said tube to oscillate.

6. The invention as defined in claim 2, characterized by said transmitter comprising an oscillator-tube comprising a plurality of electrodes, the two means for effecting a line-sectionalizing operation of the circuit-interrupter means comprising a trip-coil, and the means for causing the transmitter to transmit comprising a circuit, including said trip-coil and a closed-circuit means of each of said first and second fault-responsive relaying-means, for so altering the relative potential of one of said electrodes relative to another, as to cause said tube to oscillate.

7. Protective relaying equipment for a transmission-line, including a signal-current pilot-channel between the ends of a line-section to be protected, and further including, at each of said ends, a normally nontransmitting signal-current transmitter and a signal-current receiver-relay associated with said pilot-channel, a line-sectionalizing circuit-interrupter means, a first and a second fault-responsive relaying-means which are responsive to line-faults, the second fault-responsive relaying-means being the more sensitive, a directional relaying-means responsive to line-fault conditions, means responsive to a receipt of signal-current for restraining said receiver-relay against responding, means responsive jointly to a response of said second fault-responsive relaying-means and to a predetermined condition of said directional relaying-means for causing a response of said receiver-relay in the absence of said restraint and for preventing said transmitter from transmitting signal-current into said pilot-channel, means for utilizing a response of said first fault-responsive relaying-means for causing said transmitter to transmit signal-current into said pilot-channel in the absence of said prevention, means jointly responsive to a response of said first fault-responsive relaying-means and to a predetermined condition of said directional relaying-means for effecting a line-sectionalizing operation of said circuit-interrupter means, and means triply responsive to a response of said second fault-responsive relaying-means, a predetermined condition of said directional relaying-means, and a response of said receiver-relay, for effecting a line-sectionalizing operation of said circuit-interrupter means; characterized by said transmitter comprising an oscillator-tube comprising an anode, a cathode, a grid, and potentiometer-means having an intermediate point thereof connected to the grid and having one terminal thereof connected to another electrode of the tube, the means for causing the transmitter to transmit comprising a relatively low-resistance circuit for joining the grid to said other electrode, and the means for preventing the transmitter from transmitting comprising a relatively low-resistance circuit for bringing the grid-potential abnormally closer to that of the other terminal of the potentiometer-means.

8. Protective relaying equipment for a transmission-line, including a signal-current pilot-channel between the ends of a line-section to be protected, and further including, at each of said ends, a normally nontransmitting signal-current transmitter and a signal-current receiver-relay associated with said pilot-channel, a line-sectionalizing circuit-interrupter means, a first and a second fault-responsive relaying-means which are responsive to line-faults on both sides of the relaying point, the second fault-responsive relaying-means being the more sensitive and having a reach to respond to faults, accompanied by current-flow into the protected line-section, further away than the length of the protected line-section but not as far away as said length plus the reach of the first fault-responsive relaying-means when the latter is responding to current-flow out of the protected line-section, a directional relaying-means sensitively responsive to line-fault coinditions accompanied by current-flow into the protected line-section, means responsive to a receipt of signal-current for restraining said receiver-relay against responding, means responsive to a joint response of said second fault-responsive relaying-means and said directional relaying-means for causing a response of said receiver-relay in the absence of said restraint and for preventing said transmitter from transmitting signal-current into said pilot-channel, means for utilizing a response of said first fault-responsive relaying-means for causing said transmitter to transmit signal-current into said pilot-channel in the absence of said prevention, means responsive to a joint response of said first fault-responsive relaying-means and said directional relaying-means for effecting a line-sectionalizing operation of said circuit-interrupter means, and means responsive to a triple response of said second fault-responsive relaying-means, said directional relaying-means, and said receiver-relay, for effecting a line-sectionalizing operation of said circuit-interrupter means; characterized by said transmitter comprising an oscillator-tube comprising an anode, a cathode, a grid, and potentiometer-means having an intermediate point thereof connected to the grid and having one terminal thereof connected to another electrode of the tube, the means for causing the transmitter to transmit comprising a relatively low-resistance circuit for joining the grid to said other electrode, and the means for preventing the transmitter from transmitting comprising a relatively low-resistance circuit for bringing the grid-potential abnormally closer to that of the other terminal of the potentiometer-means.

9. The invention as defined in claim 1, characterized by said transmitter comprising an oscillator-tube comprising an anode, a cathode, a grid, and potentiometer-means having an intermiedate point thereof connected to the grid and having one terminal thereof connected to another electrode of the tube, the means for causing the transmitter to transmit comprising a relatively low-resistance circuit for joining the grid to said other electrode, and the means for preventing the transmitter from transmitting comprising a relatively low-resistance circuit for bringing the grid-potential abnormally closer to that of the other terminal of the potentiometer-means.

10. The invention as defined in claim 2, characterized by said transmitter comprising an oscillator-tube comprising an anode, a cathode, a grid, and potentiometer-means having an intermediate point thereof connected to the grid and having one terminal thereof connected to another electrode of the tube, the means for causing the transmitter to transmit comprising a relatively low-resistance circuit for joining the grid to said other electrode, and the means for preventing the transmitter from transmitting comprising a relatively low-resistance circuit for bringing the grid-potential abnormally closer to that of the other terminal of the potentiometer-means.

11. Protective relaying equipment for a transmission-line, including a signal-current pilot-channel between the ends of a line-section to be protected, and further including, at each of said ends, a normally nontransmitting signal-current transmitter and a signal-current receiver-relay associated with said pilot-channel, a line-sectionalizing circuit-interrupter means, a first and a second fault-responsive relaying-means which are responsive to line-faults, the second fault-responsive relaying-means being the more sensitive, a directional relaying-means responsive to line-fault conditions, means responsive to a receipt of signal-current for restraining said receiver-relay against responding, means responsive jointly to a response of said second fault-responsive relaying-means and to a predetermined condition of said directional relaying-means for causing a response of said receiver-relay in the absence of said restraint and for preventing said transmitter from transmitting signal-current into said pilot-channel, means for utilizing a response of said first fault-responsive relaying-means for causing said transmitter to transmit signal-current into said pilot-channel in the absence of said prevention, means jointly responsive to a response of said first fault-responsive relaying-means and to a predetermined condition of said directional relaying-means for effecting a line-sectionalizing operation of said circuit-interrupter means, and means triply responsive to a response of said second fault-responsive relaying-means, a predetermined condition of said directional relaying-means, and a response of said receiver-relay, for effecting a line-sectionalizing operation of said circuit-interrupter means; characterized by said transmitter comprising an oscillator-tube comprising a plurality of electrodes, and potentiometer-means having an intermediate point thereof connected to a first electrode and having one terminal thereof connected to another electrode of the tube, the means for causing a receiver-relay response in the absence of said restraint comprising an auxiliary relay having an operating coil connected to said first electrode, the means for causing the transmitter to transmit comprising a relatively low-resistance circuit for joining said first electrode to said other electrode, and the means for preventing the transmitter from transmitting comprising a relatively low-resistance circuit for bringing the potential of said first electrode abnormally closer to that of the other terminal of the potentiometer-means.

12. Protective relaying equipment for a transmission-line, including a signal-current pilot-channel between the ends of a line-section to be protected, and further including, at each of said ends, a normally non-transmitting signal-current transmitter and a signal-current receiver-relay associated with said pilot-channel, a line-sectionalizing circuit-interrupter means, a first and a second fault-responsive relaying-means which are responsive to line-faults on both sides of the relaying point, the second fault-responsive relaying-means being the more sensitive and having a reach to respond to faults, accompanied by current-flow into the protected line-section, further away than the length of the protected line-section but not as far away as said length plus the reach of the first fault-responsive relaying-means when the latter is responding to current-flow out of the protected line-section, a directional relaying-means sensitively responsive to line-fault conditions accompanied by current-flow into the protected line-section, means responsive to a receipt of signal-current for restraining said receiver-relay against responding, means responsive to a joint response of said second fault-responsive relaying-means and said directional relaying-means for causing a response of said receiver-relay in the absence of said restraint and for preventing said transmitter from transmitting signal-current into said pilot-channel, means for utilizing a response of said first fault-responsive relaying-means for causing said transmitter to transmit signal-current into said pilot-channel in the absence of said prevention, means responsive to a joint response of said first fault-responsive relaying-means and said directional relaying-means for effecting a line-sectionalizing operation of said circuit-interrupter means, and means responsive to a triple response of said second fault-responsive relaying-means, said directional relaying-means, and said receiver-relay, for effecting a line-sectionalizing operation of said circuit-interrupter means; characterized by said transmitter comprising an oscillator-tube comprising a plurality of electrodes, and potentiometer-means having an intermediate point thereof connected to a first electrode and having one terminal thereof connected to another electrode of the tube, the means for causing a receiver-relay response in the absence of said restraint comprising an auxiliary relay having an operating coil connected to said first electrode, the means for causing the transmitter to transmit comprising a relatively low-resistance circuit for joining said first electrode to said other electrode, and the means for preventing the transmitter from transmitting comprising a relatively low-resistance circuit for bringing the potential of said first electrode abnormally closer to that of the other terminal of the potentiometer-means.

13. Protective relaying equipment for a transmission-line, including a signal-current pilot-channel between the ends of a line-section to be protected, and further including, at each of said ends; a normally non-transmitting signal-current transmitter and a signal-current receiver-relay associated with said pilot-channel; said transmitter comprising an oscillator-tube comprising a plurality of electrodes; and potentiometer-means having an intermediate point thereof connected to a first electrode and having one terminal thereof connected to another electrode of the tube; a line-sectionalizing circuit-interrupter means including a trip-coil; a first and a second fault-responsive relaying-means which are responsive to line-faults, the second fault-responsive relaying means being the more sensitive; a directional relaying-means responsive to line-fault conditions; said receiver-relay and each of said fault-responsive relaying-means each having a normally open circuit-means which is in closed condition when the relaying-means responds, said directional relaying-means having a circuit-means which is in closed condition when the line-current-flow is into the protected line-section; means responsive to a receipt of signal-current for restraining said receiver-relay against responding; a relatively low-resistance transmitter-initiating circuit, serially including said trip-coil, the circuit-means of said first fault-responsive relaying-means, and the circuit-means of said second fault-responsive relaying-means, for joining said first electrode to said other electrode; a transmitter-restraining by-passing circuit, serially including the aforesaid circuit-means of said second fault-responsive relaying-means, for bringing the potential of said first electrode abnormally closer to that of the other terminal of the potentiometer-means; an auxiliary relay having an operating coil connected to said first electrode; means responsive to a response of said auxiliary relay for causing a response of said receiver-relay in the absence of said restraint; a tripping circuit serially including the aforesaid contact-means of said directional relaying-means, the aforesaid contact-means of said first fault-responsive relaying-means, and the aforesaid trip-coil; and a tripping circuit serially including the aforesaid contact-means of said directional relaying-means, the aforesaid contact-means of said second fault-responsive relaying-means, the contact-means of said receiver-relay, and the aforesaid trip-coil.

14. Protective relaying equipment for a transmission-line, including a signal-current pilot-channel between the ends of a line-section to be protected, and further including, at each of said ends; a normally nontransmitting signal-current transmitter and a signal-current receiver-relay associated with said pilot-channel; said transmitter comprising an oscillator-tube comprising a plurality of electrodes; and potentiometer-means having an intermediate point thereof connected to a first electrode and having one terminal thereof connected to another electrode of the tube; a line-sectionalizing circuit-interrupter means including a trip-coil; a first and a second fault-responsive relaying-means which are responsive to line-faults on both sides of the relaying point; the second fault-responsive relaying-means being the more sensitive and having a reach to respond to faults, asccompanied by current-flow into the protected line-section, further away than the length of the protected line-section but not as far away as said length plus the reach of the first fault-responsive relaying-means when the latter is responding to current-flow out of the protected line-section; a directional relaying-means sensitively responsive to line-fault conditions accompanied by current-flow into the protected line-section; said receiver-relay and each of said relaying-means each having a normally open circuit-means which is in closed condition when the relaying-means responds; means responsive to a receipt of signal-current for restraining said receiver-relay against responding; a relatively low-resistance transmitter-initiating circuit, serially including said trip-coil, the circuit-means of said first fault-responsive relaying-means, and the circuit-means of said second fault-responsive relaying-means for joining said first electrode to said other electrode; a transmitter-restraining by-passing circuit, serially including the aforesaid circuit-means of said second fault-responsive relaying-means and the circuit-means of said directional relaying-means, for bringing the potential of said first electrode abnormally closer to that of the other terminal of the potentiometer-means; an auxiliary relay having an operating coil connected to said first electrode; means responsive to a response of said auxiliary relay for causing a response of said receiver-relay in the absence of said restraint; a tripping circuit serially including the aforesaid contact-means of said directional relaying-means, the aforesaid contact-means of said first fault-responsive relaying-means, and the aforesaid trip-coil; and a tripping circuit serially including the aforesaid contact-means of said directional relaying-means, the aforesaid contact-means of said second fault-responsive relaying-means, the contact-means of said receiver relay, and the aforesaid trip-coil.

BERNARD E. LENEHAN.